(12) United States Patent
Shen et al.

(10) Patent No.: US 8,280,444 B1
(45) Date of Patent: Oct. 2, 2012

(54) REDUCING MULTI-CELL INTERFERENCE USING COOPERATIVE RANDOM BEAM FORMING

(75) Inventors: Manyuan Shen, Bellevue, WA (US); Guanbin Xing, Issaquah, WA (US); Xun Shao, Bellevue, WA (US)

(73) Assignee: Adaptix, Inc., Carrollton, TX (US)

( * ) Notice: Subject to any disclaimer, the term of this patent is extended or adjusted under 35 U.S.C. 154(b) by 1016 days.

(21) Appl. No.: 12/037,758

(22) Filed: Feb. 26, 2008

(51) Int. Cl.
*H04M 1/00* (2006.01)
*H04B 1/38* (2006.01)

(52) U.S. Cl. .................................. 455/562.1; 455/561

(58) Field of Classification Search ............. 455/562.1, 455/277.1, 450, 452, 62, 561, 524, 525, 575.7, 455/269
See application file for complete search history.

(56) References Cited

U.S. PATENT DOCUMENTS

| | | | |
|---|---|---|---|
| 6,233,466 B1 | 5/2001 | Wong et al. | |
| 8,000,745 B2 | 8/2011 | Kuwahara et al. | |
| 2002/0098873 A1 | 7/2002 | Alexiou | |
| 2006/0009189 A1 | 1/2006 | Kim et al. | |
| 2008/0159122 A1 | 7/2008 | Dor | |

OTHER PUBLICATIONS

U.S. Appl. No. 12/037,736, Xing et al.

*Primary Examiner* — Eugene Yun
(74) *Attorney, Agent, or Firm* — Martin & Ferraro, LLP

(57) ABSTRACT

Systems and methods which implement cooperative random or quasi-random beam forming as between a plurality of base stations in a wireless network to reduce multi-cell interference are shown. For example, a plurality of base stations in a wireless network cooperate to provide frequency resources, such as channels, subchannels, subcarriers, etc., in a plurality of randomesque beams. In operation, subscriber stations preferably analyze signals as received on a plurality of the randomesque beams to determine one or more "best" beams for use in communication between the subscriber station and base station. Assuming an identified beam is available for use by the subscriber station, payload communications may be provided using one or more beams identified by the subscriber station as a "best" beam. The base stations of the wireless network preferably cooperate to periodically reform the randomesque beams.

24 Claims, 4 Drawing Sheets

REDUCING MULTI-CELL INTERFERENCE USING COOPERATIVE RANDOM BEAM FORMING

REFERENCE TO RELATED APPLICATIONS

The present application is related to co-pending and commonly assigned U.S. patent application Ser. No. 12/037,736 entitled "LOW OVERHEAD SIGNALING FOR IMPLEMENTING SPATIAL DIVISION MULTIPLE ACCESS (SDMA)," filed concurrently herewith, the disclosure of which is hereby incorporated herein by reference.

TECHNICAL FIELD

The invention relates generally to wireless communications and, more particularly, to techniques for reducing multi-cell interference using cooperative random or quasi-random beam forming.

BACKGROUND OF THE INVENTION

In recent years wireless communication networks having a plurality of base stations or other access points to provide wireless communication links pervasively throughout a composite service area have become almost ubiquitous. In providing pervasive coverage throughout a composite service area, base stations of such communications networks are often disposed in proximity such that inter-base station interference is experienced. For example, cellular base station deployment patterns used with respect to cellular telephone networks and even some metropolitan area networks (MANs) dispose base stations such that mutual interference is experienced. Such inter-cell interference can lead to unacceptably high outage rates (i.e., an unacceptably high number of communications which cannot be conducted), decreased throughput rates, decreased signal quality, etc., particularly with respect to subscriber stations disposed near the edge of a cell.

Various techniques have been employed to mitigate or avoid inter-cell interference. For example, frequency reuse patterns (e.g., frequency reuse of 7, wherein only every $7^{th}$ cell in the cellular deployment pattern may use a particular frequency) have been developed so as to separate the cells in which any particular frequency is reused by sufficient distances, thereby resulting in attenuation of inter-cell signals for interference mitigation. However, such frequency reuse patterns result in substantial spectral inefficiency. For example, in the foregoing frequency reuse of 7 example, the frequency reuse pattern results in a 86% decrease in the available spectrum at any particular base station.

Another technique that has been used to mitigate inter-cell interference is downlink power control. However, appreciable feedback overhead is utilized in providing information for downlink power control from the subscriber stations to their respective base station. Moreover, such downlink power control not only reduces the signal energy and thus the interference in a neighboring cell, but it also reduces the energy of the signal as received by an intended subscriber station. Accordingly, many subscriber stations, such as those disposed near the edge of a cell, those in a shadow or signal fade, etc., may experience outages, decreased throughput, decreased signal quality, etc.

Interference cancellation is yet another technique that has been used to mitigate inter-cell interference. Subscriber stations have been adapted to include sophisticated circuitry which actively cancels interfering signals from desired signals in the signal as received by the subscriber station. However, such circuitry is typically complicated, requiring appreciable knowledge with respect to the interfering signal and/or desired signal for effective cancellation. Accordingly, such circuitry is often relatively expensive, increasing the cost and complexity of subscriber stations appreciably.

Where base stations have been equipped with multiple antennas, downlink beam forming has been used to mitigate multi-cell interference. For example, highly directional antenna beams have been used to direct signal energy to a single selected subscriber station, thereby minimizing signal energy propagating into neighboring cells. However, such downlink beamforming typically requires either feedback of channel state information (CSI) or an assumption that the downlink has the identical channel as the uplink and the radio frequency (RF) front end is calibrated to compensate for the mismatch between the uplink transmitting and downlink receiving circuits. Feedback of CSI generally requires large overhead signaling, and thus results in spectral inefficiency. Assuming that the downlink has the identical channel as the uplink (e.g., to avoid downlink CSI feedback by measuring uplink CSI at the base station) is often not accurate, particularly in frequency division multiplex (FDM) systems and even time division multiplex (TDM) systems where the subscriber stations are highly mobile or fast moving. Calibration of RF front end circuitry to compensate for the mismatch between uplink transmitting and downlink receiving circuits is relatively complicated, resulting in appreciably increased implementation and deployment costs.

Although not utilized for avoiding or mitigating inter-cell interference, a technique for implementing spatial division multiple access (SDMA) at a base station has opportunistically relied upon random beam configurations, which are not formed to address channel characteristics experienced by any particular subscriber station, and the random distribution of subscriber stations to provide SDMA grouping and SDMA resource assignment with respect to subscriber stations. For example, the base station may form a plurality of random beams, each subscriber station in that base station's service area may measure the signal quality with respect to each of the random beams and report a best beam to the base station, and the base station may assign this beam (assuming the beam is not already assigned to another subscriber station for the same frequency resource) to the subscriber station. Other subscriber stations in the base station's service area may similarly be assigned different random beams, although each using a same frequency resource assignment.

BRIEF SUMMARY OF THE INVENTION

The present invention is directed to systems and methods which implement cooperative random or quasi-random (collectively referred to as randomesque) beam forming as between a plurality of base stations or other access points in a wireless network to reduce multi-cell interference. For example, a plurality of base stations in a wireless network cooperate to provide frequency resources, such as channels, subchannels, subcarriers, etc., in a plurality of randomesque beams. The beam forming coefficients for the randomesque beams may be arbitrary, thus providing random beams, or may be controlled or constrained in one or more regard, such as to result in orthogonality with respect to beams providing a same frequency resource at neighboring base stations, thus providing quasi-random beams. The base stations preferably cooperate with respect to the timing for forming the randomesque beams and reforming (e.g., changing the beam forming coefficients) the randomesque beams. Where quasi-random beam configurations are used, the base stations further preferably cooperate to implement beam forming coefficients providing orthogonal beams used to carry a same frequency resource at neighboring (i.e., disposed such that unacceptable interference may otherwise be experienced) base stations.

In operation according to a preferred embodiment of the invention, subscriber stations analyze signals as received on a plurality of the randomesque beams to determine one or more "best" beams for use in communication between the subscriber station and base station. A report regarding one or more beams for use by the subscriber station may be made to the base station. Thereafter, assuming an identified beam is available for use by the subscriber station (i.e., the beam has not already been allocated to another subscriber station or the beam is not already allocated to capacity), payload communications may be provided using one or more beams identified by the subscriber station as a "best" beam.

The base stations of the wireless network preferably periodically reform the randomesque beams. For example, in cooperation, each base station may implement a different set of beam forming coefficients to regenerate randomesque beams every frame, every super-frame, every predetermined number (e.g., 10) of frames, etc. Such reforming of the randomesque beams may be utilized to ensure that all subscriber stations will at least periodically identify at least one randomesque beam which instantaneously matches or substantially matches their channel conditions. Additionally or alternatively, such reforming of the randomesque beams may be utilized to ensure that the service area for each bases station is illuminated for communications.

It should be appreciated that the cooperative operation of the base stations in providing the foregoing randomesque beams will result in reduced communication outages for certain subscriber stations, such as those disposed near a cell's edge, while enabling aggressive frequency reuse. According to embodiments of the invention, a frequency reuse of 1 (i.e., each frequency is reused at each base station of the network) is achievable using the concepts of the present invention, thereby providing a high level of spectral efficiency. Additionally, because low signaling overhead is utilized in providing identification of selected randomesque beams from the subscriber stations to the base station, additional spectral efficiencies are realized according to embodiments of the invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
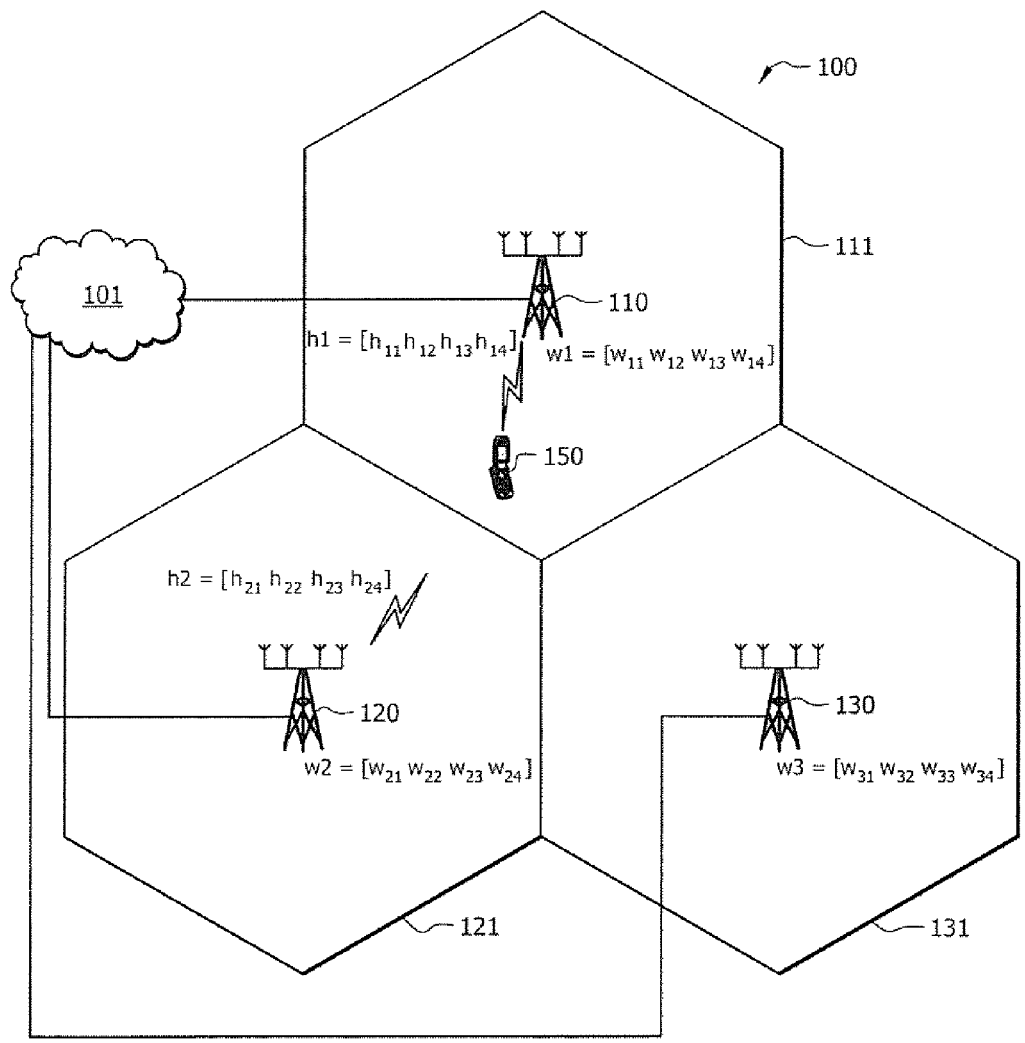
FIG. 1 shows a communication system adapted according to an embodiment of the present invention.

Directing attention to FIG. 1, communication system 100 adapted according to an embodiment of the present invention is shown. In the illustrated embodiment, communication system 100 includes a plurality of base stations, shown as base stations 110-130, each having a service area associated therewith, shown as cells 111-131 respectively. Subscriber station 150 is disposed within service area 111 of base station 110. Base stations 110-130 of communication system 100 may operate to provide a local area network (LAN), metropolitan area network (MAN), or wide area network (WAN).

It should be appreciated that communication system 100 of embodiments may include numbers of base stations and/or subscriber stations different than that shown. For example, communication system 100 may comprise a plurality of subscriber stations disposed throughout service areas 111-131. Communication between such subscriber stations and base stations 110-130 may be provided using a number of multiple access techniques, such as frequency division multiple access (FDMA), time division multiple access (TDMA), code division multiple access (CDMA), and/or spatial division multiple access (SDMA).

Figure 2:
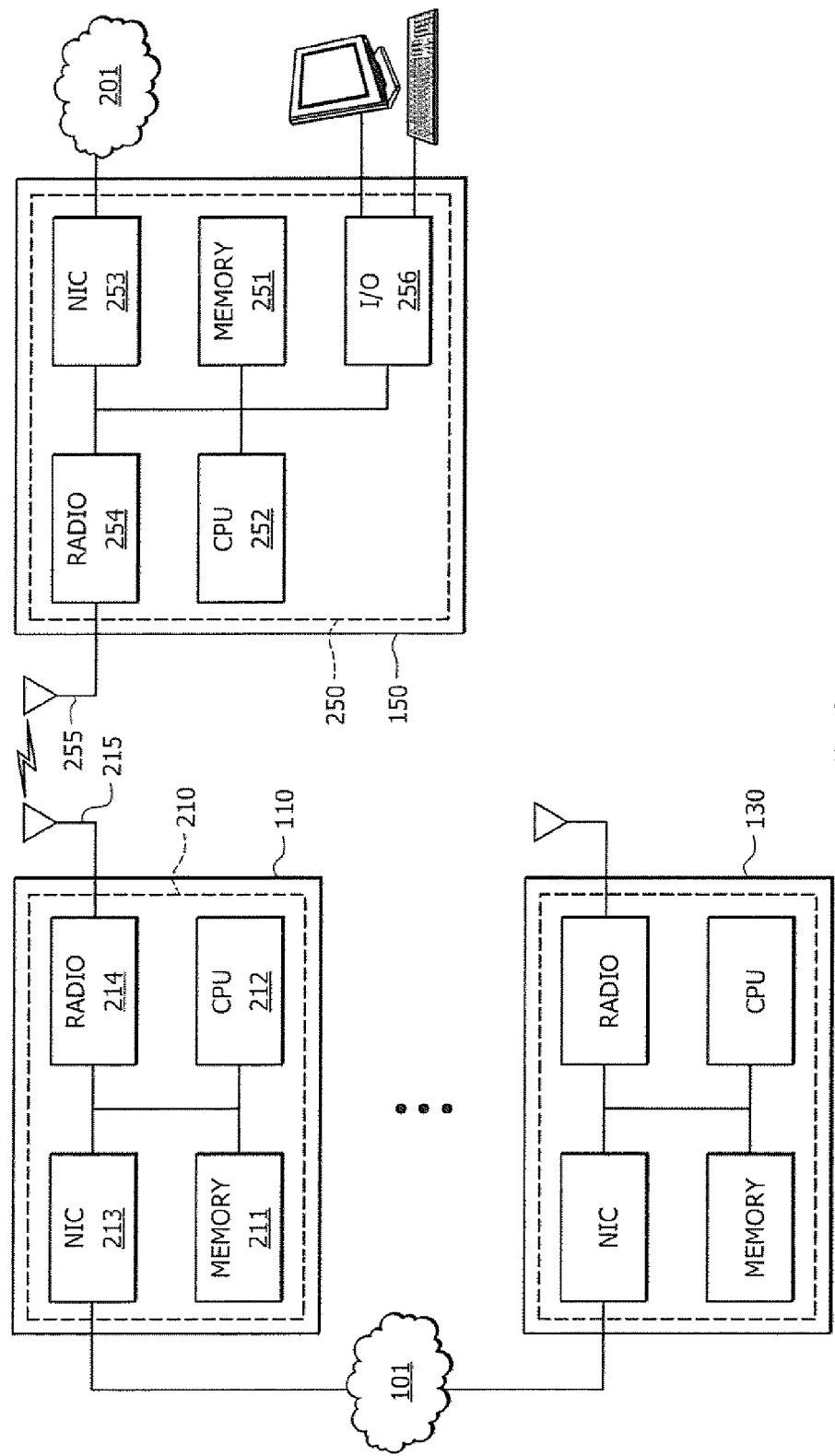
FIG. 2 shows detail with respect to a base station and a subscriber station adapted according to an embodiment of the present invention.

FIG. 2 shows detail with respect to base and subscriber stations as may be utilized according to embodiments of the invention. Base stations 110-130 of the illustrated embodiment may, for example, comprise a network access point, a network router, a network switch, a network gateway, etc. adapted to provide operation as described herein. Subscriber station 150 of the illustrated embodiment may, for example, comprise a personal computer, a personal digital assistant (PDA), a cellular telephone, a server, and/or other processor based information processing or communication device. It should be appreciated that various subscriber stations may be mobile or stationary. Similarly, although base stations are traditionally stationary, embodiments of the invention may implement a mobile base station configuration.

The illustrated embodiment of base station 110 includes memory 211, central processing unit (CPU) or processor 212, network interface card (NIC) 213, radio 214, and antenna 215. It should be appreciated that base stations 120 and 130 may be similarly configured, or may be configured differently than the illustrated embodiment of base station 110. The foregoing functional blocks may be provided in discrete components or may be combined into one or more integrated components. For example, embodiments of the present invention may utilize one or more application specific integrated circuits (ASICs) ASIC 210) to provide the functional blocks shown. Of course, embodiments of the invention may include additional or alternative functional blocks with respect to a base station adapted according to the concepts described herein, if desired.

Memory 211, such as may comprise integrated circuit memory modules, disk memory, magnetic memory, optical memory, flash memory, and/or the like, is preferably used to store instruction sets (e.g., control programs) and data. An instruction set stored by memory 211 preferably provides code defining operation of base station 110 in accordance with the concepts of the present invention. Instruction sets stored by memory 211 may additionally include programs for providing other desired operations, such as programs that exchanges data with other nodes via network 101, programs for carrying out communications protocols, etc.

CPU 212 may comprise any processor architecture suitable for providing operation according to the concepts of the present invention, such as a PENTIUM processor available from Intel Corporation, a 680X0 processor available from Motorola, Inc., a POWERPC processor available from the AIM alliance (Apple-IBM-Motorola), etc. CPU 212 preferably processes instructions of an instruction set in order to execute programs stored in memory. CPU 212 may further operate to control communication, such as by supplying control signals to NIC 213 and/or radio 214. CPU 212 of a preferred embodiment generally operates to coordinate inter-cell interference mitigation operation with other nodes (e.g., base stations 120 and 130), assigning resources for use with respect to nodes (e.g., subscriber station 150), determining beam configurations, and coordinating operation of the functional blocks of base station 110. Although base station 110 may utilize CPU 212 to provide primary operational control with respect to the functional aspects of the base station, embodiments of the invention may implement a more distributed processing architecture. For example, NIC 213 and/or radio 214 may include some processor capability and, thereby, provide at least some level of control with respect to communication of information via respective links.

NIC 213 provides an interface to network 101. NIC 212 preferably includes hardware and software for carrying out low-level protocols for communication via network 101. Accordingly, NIC 213 facilitates base station 110 communicating data with other nodes, such as may comprise servers, subscriber stations, base stations, etc., that are accessible by network 101.

Radio 214 provides an interface to antenna 215 and the wireless links provided thereby. Radio 214 preferably includes modulation and signaling features, e.g., modem and/or radio, that drive the antenna 215 thus allowing the wireless device to transmit and receive data to and from other nodes, such as may comprise servers, subscriber stations, other base stations, etc.

Antenna 215 provides a transducer for providing an air interface. It should be appreciated that, although the illustrated embodiment shows a single antenna, antenna 215 may comprise a plurality of individual antennas, a plurality of antenna elements cooperative to provide an antenna array (e.g., a phased array), and/or the like operable to provide beams or antenna patterns as described herein. Moreover, although antenna 215 is represented as a radio frequency (RF) transducer in the illustrated embodiment, it should be appreciated that wireless communication links based upon other signal propagation technologies may be utilized in addition to or in the alternative to RF links according to the present invention. For example, rather than a RF transducer, antenna 215 may comprise a light energy transducer, such as a LASER transceiver or infrared (IR) light emitting diode (LED) for providing a wireless link.

Network 101 may comprise a LAN, a MAN, a WAN (e.g., the Internet), a wireless network, a cable transmission system, the public switched telephone network (PSTN), a satellite network, and/or the like. Base station 110 may provide a point of presence on network 101 for subscriber station 150. Network 101 of embodiments provides a backbone for interconnecting a plurality of base stations, including base stations 110-130, in a cooperative wireless network.

The illustrated embodiment of subscriber station 150 includes memory 251, CPU 252, NIC 253, radio 254, antenna 255, and input/output (I/O) 256. The foregoing functional blocks may be provided in discrete components or may be combined into one or more integrated components. For example, embodiments of the present invention may utilize one or more ASICs (e.g., ASIC 250) to provide the functional blocks shown. Of course, embodiments of the invention may include additional or alternative functional blocks with respect to a subscriber station adapted according to the concepts described herein, if desired. It should be appreciated that, although detail with respect to subscriber station 150 is shown, other subscriber stations may be similarly configured.

As with memory 211 discussed above, memory 251 may comprise integrated circuit memory modules, disk memory, magnetic memory, optical memory, flash memory, and/or the like, and is preferably used to store instruction sets and data. An instruction set stored by memory 251 preferably provides code defining operation of subscriber station 150 in accordance with the concepts of the present invention. Instruction sets stored by memory 251 may additionally include programs for providing other desired operations, such as programs that exchanges data with other nodes via network 101 and/or 201, programs for carrying out communications protocols, various user application programs (e.g., web browser, data processing, personal productivity, and the like), etc.

As with CPU 212 discussed above, CPU 252 may comprise any processor architecture suitable for providing operation according to the concepts of the present invention, such as a PENTIUM processor available from Intel Corporation, a 680X0 processor available from Motorola. Inc., a POWERPC processor available from the AIM alliance (Apple-IBM-Motorola), etc. CPU 252 preferably processes instructions of an instruction set in order to execute programs stored in memory. CPU 252 may further operate to control communication, such as by supplying control signals to NIC 253 and/or radio 254, and input/output, such as by controlling I/O 256 to accept data input and/or provide data output. CPU 252 of a preferred embodiment generally operates to determine communication characteristics for various beams, provide feedback in the form or antenna beam index information and/or channel characteristic information to a control system such as base station 110, and coordinating operation of the functional blocks of subscriber station 150. Although subscriber station 150 may utilize CPU 252 to provide primary operational control with respect to the functional aspects of the subscriber station, embodiments of the invention may implement a more distributed processing architecture. For example, NIC 253 and/or radio 254 may include some processor capability and, thereby, provide at least some level of control with respect to communication of information via respective links.

NIC 253 provides an interface to network 201. NIC 253 preferably includes hardware and software for carrying out low-level protocols for communication via network 201. Accordingly, NIC 253 facilitates subscriber station 150 communicating data with other nodes, such as may comprise servers, subscriber stations, base stations, etc., that are accessible by network 201. It should be appreciated that embodiments of a subscriber station may not be coupled to a network such as network 201 and thus may omit NIC 253. For example, a wireless PDA or cellular telephone may include radio 254 for providing a wireless link without including NIC 253 for coupling to network 201. However, other subscriber station configurations, such as a personal computer, a server, or a gateway, may include NIC 253 to provide communication both through the wireless link provided by radio 254 and network 201, such as may comprise a LAN or other network.

Radio 254 provides an interface to antenna 255 and the wireless links provided thereby. Radio 254 preferably includes modulation and signaling features, e.g., modem and/or radio, that drive the antenna 255 thus allowing the wireless device to transmit and receive data to and from other nodes, such as may comprise servers, subscriber stations, other base stations, etc.

Antenna 255 provides a transducer for providing an air interface. As with antenna 215 discussed above, it should be appreciated that, although the illustrated embodiment shows a single antenna, antenna 255 may comprise a plurality of individual antennas, a plurality of antenna elements cooperative to provide an antenna array (e.g., a phased array), and/or the like operable to provide beams or antenna patterns as described herein. Although illustrated as an RF transducer, where antenna 215 provides wireless communication links based upon signal propagation technologies other than RF, antenna 255 provides a corresponding transducer configuration.

Similar to network 101 discussed above, network 201 may comprise a LAN, a MAN, a WAN (e.g., the Internet), a wireless network, a cable transmission system, the PSTN, a satellite network, and/or the like. Subscriber station 150 may, for example, provide a gateway between network 201 and the wireless links provided according to the present invention.

I/O 256 provides an interface for data input and/or data output at subscriber station 150. For example, I/O 256 may be coupled to one or more input device, such as a keyboard, mouse, digitizing tablet, scanner, microphone, etc., in order to facilitate input of data at subscriber station 150. I/O 256 may additionally or alternatively be coupled to one or more output device, such as a monitor, a printer, a speaker, etc., in order to facilitate output of data at subscriber station 150.

Operation of communication system 100 to provide reduced inter-cell interference using cooperative randomesque beamforming in accordance with an embodiment of the present invention will be described with reference to the use of orthogonal frequency division multiple access (OFDMA) subchannels. It should be appreciated that embodiments of the present invention may implement different channel schemes, if desired.

Embodiments of the present invention provide inter-cell interference mitigation for downlink transmission in an OFDMA system using different randomesque beamforming coefficients or vectors applied to the same subchannel (e.g., groups or clusters of subcarriers) by neighboring base stations. Such neighboring base stations may not only include base stations which are adjacent to one another, but may additionally include base stations which are disposed such that unacceptable interference may otherwise be experienced. Additionally, each base station preferably utilizes different orthogonal beamforming vectors for different subchannels at the base station. Implementation of such beamforming patterns, as well as changing of the beamforming patterns (e.g., every few frames), is preferably accomplished in a cooperative manner among the base stations.

Figure 3:
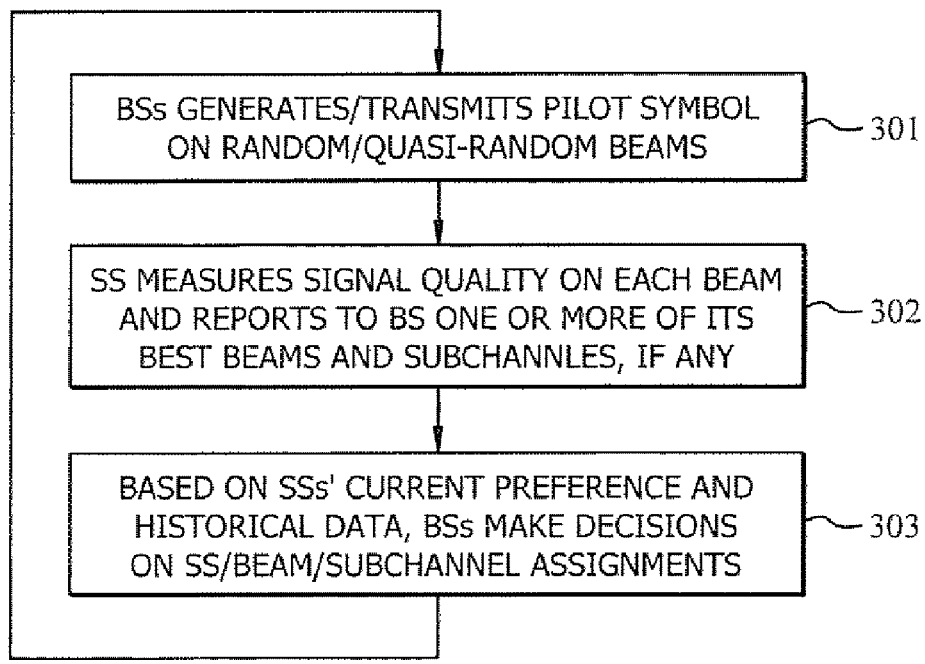
FIG. 3 shows a flow diagram of operation according to an embodiment of the present invention.
Figure 4:
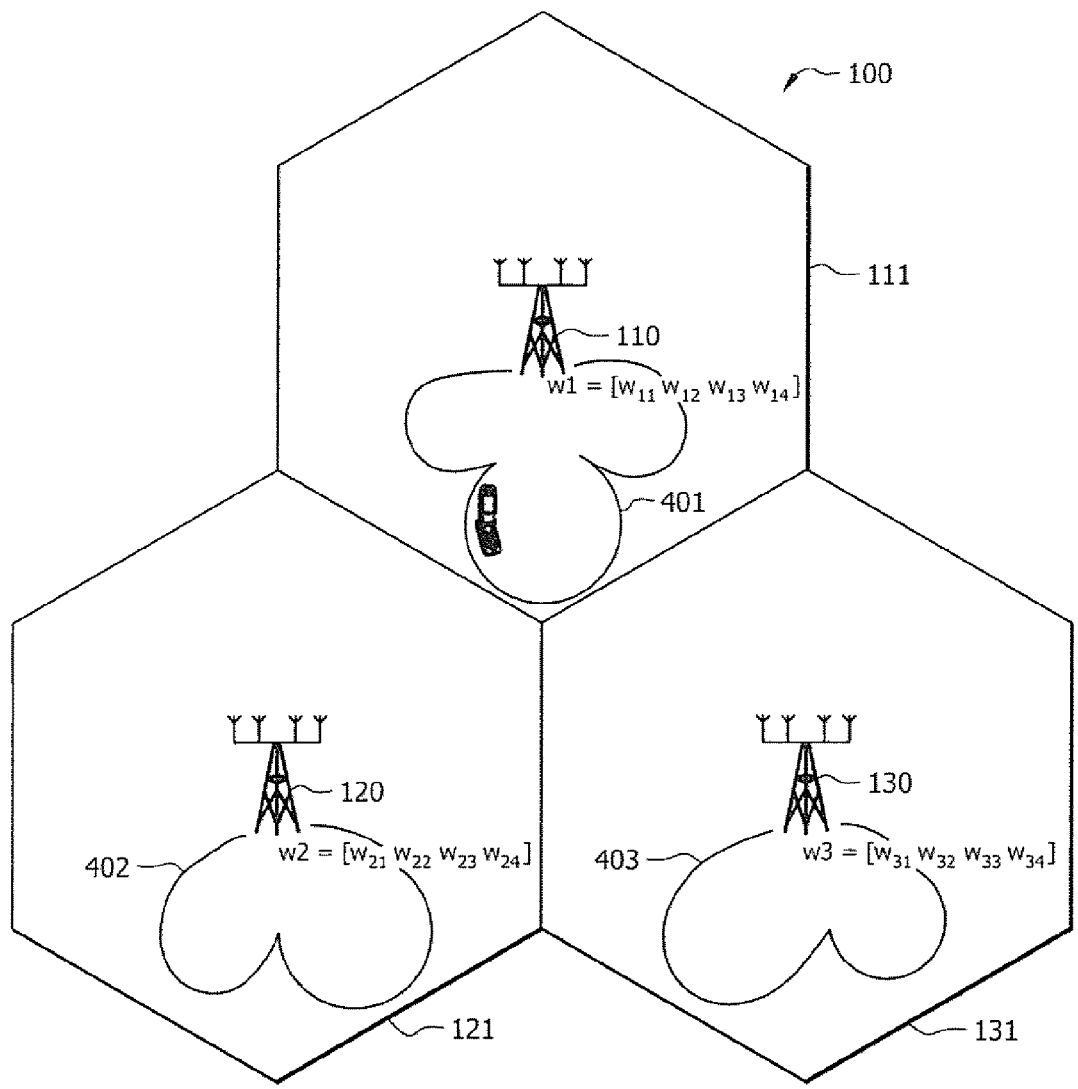
FIG. 4 shows randomesque beams provided according to an embodiment of the present invention.

Directing attention to FIG. 3, a method implementing cooperative randomesque beam forming to mitigate inter-cell interference according to an embodiment of the present invention is shown. At block 301, base stations 110-130 cooperate to generate randomesque beam configurations for analysis and selection by subscriber stations, such as subscriber station 150. The beam forming coefficients for the randomesque beams may be arbitrary, thus providing random beams, or may be controlled or constrained in one or more regard, such as to result in orthogonality with respect to beams providing a same frequency resource at neighboring base stations, thus providing quasi-random beams. The base stations preferably cooperate with respect to the timing for forming the randomesque beams, such that the randomesque beams are generated substantially simultaneously (i.e., perceived as having been generated simultaneously) by the base stations. Where quasi-random beam configurations are used, the base stations further preferably cooperate to implement beam forming coefficients providing orthogonal beams used to carry a same frequency resource at neighboring (i.e., disposed such that unacceptable interference may otherwise be experienced) base stations. FIG. 4 shows communication system 100 having orthogonal randomesque beams 401-403 generated by base station 110 for transmission of a same subchannel by each of base stations 110-130.

It should be appreciated that although FIG. 4 only shows 3 such randomesque beams, numbers and configurations different than those shown may be used. For example, embodiments provide a plurality of randomesque beams for transmission of all available subchannels at a base station sufficient in number and configuration to substantially illuminate a corresponding base station service area or a portion thereof (e.g., a sector).

Randomesque beams 401-403 illustrated in FIG. 4 have random or quasi-random configurations, although the beams are substantially orthogonal. That is, although the beam shapes (e.g., width, length, direction, number of lobes, etc.) are somewhat arbitrary, the beams are appreciably non-overlapping. The randomesque beams are preferably formed using different, orthogonal beam forming coefficients ($W_1$, $W_2$, ... $W_N$). As will be appreciated from the following discussion, such orthogonality is advantageous for ensuring mitigation of inter-cell interference. However, it should be appreciated that randomization of the beam forming parameters, coupled with changing, the beams from time to time (e.g., every few frames), ensures that mitigation of inter-cell interference will be achieved on average.

Pilot symbols may be added to the downlink transmission frame to facilitate subscriber stations measuring communication metrics as well as for use in identifying the particular randomesque beams as discussed below. The above referenced patent application entitled "LOW OVERHEAD SIGNALING FOR IMPLEMENTING SPATIAL DIVISION MULTIPLE ACCESS (SDMA)" provides detail with respect to pilot symbol designs in OFDMA subchannels as may be utilized according to embodiments of the present invention.

At block 302 of the illustrated embodiment, the subscriber stations, here subscriber station 150, measure communication metrics, such as signal quality, carrier to interference (C/I), receive signal strength, etc., for each randomesque beam (or each beam illuminating the subscriber station) and reports one or more "best" beams, if any, to the associated base station. For example, subscriber station 150 selects the best (or several best) subchannel(s) on which it experiences a best signal quality metric, such as highest signal-to-interference-plus-noise ratio (SINR). The foregoing best beam(s) are those that the beamforming vector for the selected beam is closest to matching the subscriber station's instantaneous channel condition, while being orthogonal to beamforming vectors applied by base stations of neighboring cells/sectors on that subchannel. Because different beamforming vectors are applied by the base stations across difference subchannels according to embodiments of the invention, chances that any particular cell-edge subscriber station, such as subscriber station 150, will experience a high SINR in one or more subchannel is great. Furthermore, where the base stations change the beam forming vectors from time to time, as discussed below, the chances that the subscriber stations will identify a subchannel with high SINR in a certain period of time are increased.

In the embodiment illustrated in FIG. 4, subscriber station 121 may report randomesque beam 401 as being a best beam, perhaps without reporting any other randomesque beam as being suitable. Specifically, the embodiment illustrated in FIG. 4 shows cell-edge subscriber station 150 having base station 110 as its serving base station and base stations 120 and 130 as being interfering base stations. On one particular subcarrier (or groups of subcarriers), base station 110 applies beamforming vector $W_1=[W_{11}\ W_{12}\ W_{13}\ W_{14}]$, while base stations 120 and 130 apply different beamforming vectors $W_2=[W_{21}\ W_{22}\ W_{23}\ W_{24}]$ and $W_3=[W_{31}\ W_{32}\ W_{33}\ W_{34}]$ respectively. Subscriber station 150's channel vectors or channel characteristics from base stations 110-130 on this subcarrier may be represented as $h_1=[h_{11}\ h_{12}\ h_{13}\ h_{14}]$, $h_2=[h_{21}\ h_{22}\ h_{23}\ h_{24}]$, and $h_3=[h_{31}\ h_{32}\ h_{33}\ h_{34}]$ respectively. From the foregoing, the signal on that subcarrier as received by subscriber station 150 may be represented as:

$$r = h_1^H W_1 s_1 + h_2^H W_2 s_2 + h_3^H W_3 s_3 \quad (1)$$

wherein the first term $(h_1^H\ W_1\ s_1)$ comprises the intended signal and the last two terms $(h_2^H\ W_2\ s_2$ and $h_3^H\ W_3\ s_3)$ comprise the interference. In equation (1) above, the variable "s" represents the signal transmitted from the base stations. Specifically, $s_1$ is the intended signal from the serving base station and $s_2$ and $s_3$ are the interfering signals from neighboring base stations. If the channel vector associated with base station 110 ($h_1$) aligns or substantially aligns with the randomesque beam vector used by base station 110 ($W_1$), while the channel vectors associated with base stations 120 and 130 ($h_2$ and $h_3$) are substantially orthogonal to the randomesque beam vectors used by base stations 120 and 130 ($W_2$ and $W_3$), then the interference from base stations 120 and 130 at subscriber station 150 on this subcarrier will be very small (e.g., $W_2\ h_2^H \sim=0$, and $W_3\ h_3^H \sim=0$), and subscriber station 150 will experience a very high SINR for this subcarrier. Accordingly, subscriber station 150 of embodiments will identify randomesque beam 401 as a "best" beam and will report the index of this preferred subcarrier to base station 110.

If the channel vectors associated with base stations 120 and 130 ($h_2$ and $h_3$) are not sufficiently orthogonal to the randomesque beam vectors used by base stations 120 and 130 ($W_2$ and $W_3$), subscriber station 150 may experience an undesirably high interference level on the particular subcarrier. In this situation, subscriber station 150 of embodiments may look to a different subcarrier, on which different beamforming vectors are applied, to identify a "best" randomesque beam.

The communication metrics for the various pilots (e.g., subcarriers) that were received by a subscriber station can be analyzed to determine a hierarchy of channel-independent beams. Using ranking metrics, such as the aforementioned SINR for each subcarrier received, one or more best beams in the hierarchy may then be reported to base station 110. For example, a lookup table (LUT) or other index may be used to correlate the pilots with corresponding channel-independent beam identification information (e.g., beam index). Alternatively, the pilots themselves may be directly used as channel-independent beam identification information (e.g., pilot symbols for the best beam may be returned to base station 110 by each subscriber station).

The best beam/subchannel information provided to base station 110 by subscriber stations 121-123 above includes identification of channel-independent beams, and perhaps channels, rather than CSI or other complex data. This feedback requires relatively little signaling overhead. Such feedback may be provided on a control or signaling channel or other suitable link between the subscriber station and appropriate base station. For example, a subscriber station may transmit the foregoing report on the subcarrier of a randomesque beam identified as a "best" beam by the subscriber station.

It should be appreciated that a subscriber station may identify randomesque beams associated with a plurality of base stations which are suitable for use in mitigating interference. For example, subscriber station 150 may not only identify randomesque beam of base station 110, but may also identify a randomesque beam of one or more of base stations 120 and 130. Accordingly, reporting of "best" beams as described above may comprise reporting beams associated with a plurality of base stations. Such reports may be made directly to appropriate ones of the base stations, or may be consolidated and made through a single base station, such as a base station currently conducting communications with the subscriber station. The base stations of communication system 100 may cooperatively use such multi-base station reporting to optimize communications. For example, where a subscriber station reports satisfactory conditions on randomesque beams from multiple base stations, those base stations may cooperate to provide load balancing, to optimize subscriber station capacity, to optimize signal quality, etc. Moreover, such information may be utilized in facilitating subscriber station handoff between base stations, such as where the subscriber station is mobile or where the randomesque beams generated in a particular epoch are no longer satisfactory for the subscriber station at one base station but continue to be satisfactory at another base station.

At block 303 of the illustrated embodiment, the base stations make decisions with respect to the subscriber station randomesque beam and subcarrier assignments. Having collected the subscriber station's preferences through the foregoing reports, base stations 110-130 are able to determine which subscriber stations may be provided communications using which randomesque beams and subcarriers. Embodiments of the invention use information in addition to or in the alternative to the foregoing randomesque beam indices for determining beam and subcarrier assignments for mitigating inter-cell interference. For example, such decisions may also consider the subscriber stations' report history for a more optimized selection.

In the foregoing example, it should be appreciated that only randomesque beams 401-403 as sampled using a same subchannel were considered to simplify the analysis. As mentioned above, embodiments of the invention may use a plurality of randomesque beam sets and/or a plurality of resources, such as subchannels, may be utilized in providing the reports from which resource assignments are made. Accordingly, various combinations of subscriber stations and beam and subcarrier assignments may be made from a single reporting epoch according to embodiments of the invention.

The foregoing randomesque beam configurations and/or subscriber station, randomesque beam, and subcarrier assignments are preferably periodically updated. For example, subscriber stations may continuously or periodically analyze received signals on the various randomesque beams and provide interim reports (e.g., between randomesque beam configuration change epochs) to appropriate ones of the base stations. Various assignments may be altered based upon such interim reports, such as to accommodate changes in channel conditions, movement of subscriber stations, etc. Accordingly, processing may return to block 303 of FIG. 3 to reassignment of resources. Additionally or alternatively, the base stations cooperate to change the randomesque beam configurations (i.e., change the randomesque beam forming vectors) periodically, such as upon the occurrence of an event (e.g., a threshold number of subscriber stations reporting changed randomesque beam preferences), after a predetermined number of frames (e.g., every 10 frames), after a predetermined amount of time (e.g., once every second), etc. Accordingly, processing may return to block 301 of FIG. 3 to repeat the foregoing process.

When the number of subcarriers in the system is reasonably large, the different randomesque beamforming vectors will provide good coverage of the whole signal space (e.g., service areas 111-113) so that there is a high probability that every subscriber station disposed therein will experience high SINR on at least some subcarriers. However, even if a subscriber station cannot identify a preferred subcarrier with a good SINR value at some instant in time, the subscriber station will almost assuredly identify a subcarrier with a good SINR within a given period of time as the base stations change their beamforming vectors. Moreover, it is expected that there will usually be a large number of subscriber stations in the system, and thus each subcarrier is expected to present a good SINR to one or more subscriber stations so no subcarrier will remain substantially unused.

It should be appreciated that operation according to the foregoing embodiments does not rely upon the often inaccurate assumption of downlink-uplink reciprocity. Moreover, the foregoing embodiments do not rely upon feedback of downlink channel vector information, thereby minimizing signaling overhead used.

Although embodiments have been described herein with reference to base stations providing decentralized, cooperative processing for randomesque beam generation and assignment of resources to subscriber stations, the concepts of the present invention are not so limited. For example, a central server system, such as may be in communication with the base stations through a network such as network 216, may provide some or all of the aforementioned functionality. Similarly, a single base station, such as a "master" base station, may provide such functionality for a plurality of base stations in communication therewith.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    cooperatively at a plurality of base stations generating a plurality of randomesque beams for transmission of signals for analysis by a plurality of receiver stations, said plurality of randomesque beams comprising a set of randomesque beams associated with each base station of said plurality of base stations, each set of randomesque beams having different beam configurations for use with respect to each of a plurality of frequency resources, wherein a beam configuration used with respect to a first frequency resource of said plurality of frequency resources by a first base station of said plurality of base stations is substantially orthogonal to beam configurations used with respect to said first frequency resource by all other base stations of said plurality of base stations.

2. The method of claim 1, wherein said cooperatively generating said plurality of randomesque beams comprises:
    coordinating calculation of beamforming vectors to provide said substantially orthogonal beam configurations.

3. The method of claim 1, wherein said cooperatively generating said plurality of randomesque beams comprises:
    coordinating timing for said generating said plurality of randomesque beams.

4. The method of claim 1, wherein said cooperatively generating said plurality of randomesque beams comprises:
    coordinating changing said beam configurations.

5. The method of claim 1, wherein said cooperatively generating said plurality of randomesque beams is provided by distributed processing of said plurality of base stations.

6. The method of claim 1, wherein said cooperatively generating said plurality of randomesque beams is provided by a centralized controller in communication with said plurality of base stations.

7. The method of claim 1, further comprising:
    determining randomesque beam assignments for use in providing communications with respect to receiver stations of said plurality of receiver stations using received information regarding preferred randomesque beams from said receiver stations.

8. The method of claim 7, wherein said determining said randomesque beam assignments is performed cooperatively with respect to said plurality of base stations.

9. The method of claim 8, wherein said cooperative determinations for said randomesque beam assignments are made to provide load balancing between said base stations.

10. The method of claim 8, wherein said cooperative determinations for said randomesque beam assignments are made to optimize communication quality among said base stations.

11. The method of claim 8, wherein said cooperative determinations for said randomesque beam assignments are made to optimize communication capacity among said base stations.

12. A method comprising:
    cooperatively at a plurality of base stations generating a plurality of randomesque beams for transmission of signals for analysis by a plurality of receiver stations, said randomesque beams having not been configured for use with respect to any particular receiver station of said receiver stations; and
    determining a randomesque beam assignment for use in providing communications with respect to receiver stations of said plurality of receiver stations using information received from receiving stations of said plurality of receiving stations regarding preferred randomesque beams of said plurality of randomesque beams.

13. The method of claim 12, wherein said plurality of randomesque beams comprise a set of randomesque beams associated with each base station of said plurality of base stations, each set of randomesque beams having different beam configurations for use with respect to each of a plurality of frequency resources, wherein a beam configuration used with respect to a first frequency resource of said plurality of frequency resources by a first base station of said plurality of base stations is substantially orthogonal to beam configurations used with respect to said first frequency resource by all other base stations of said plurality of base stations.

14. The method of claim 12, wherein said cooperatively generating said plurality of randomesque beams comprises:
coordinating calculation of beamforming vectors to provide said substantially orthogonal beam configurations.

15. The method of claim 12, wherein said cooperatively generating said plurality of randomesque beams comprises:
coordinating timing for said generating said plurality of randomesque beams.

16. The method of claim 12, wherein said cooperatively generating said plurality of randomesque beams comprises:
coordinating changing said beam configurations.

17. The method of claim 12, wherein said determining said randomesque beam assignments is performed cooperatively with respect to said plurality of base stations.

18. The method of claim 17, wherein said cooperative determinations for said randomesque beam assignments are made to provide load balancing between said base stations.

19. The method of claim 17, wherein said cooperative determinations for said randomesque beam assignments are made to optimize communication quality among said base stations.

20. The method of claim 17, wherein said cooperative determinations for said randomesque beam assignments are made to optimize communication capacity among said base stations.

21. A system comprising:
a plurality of base stations adapted to cooperatively generate a plurality of randomesque beams for transmission of a signal for analysis by a plurality of subscriber stations, cooperatively determine a randomesque beam assignments for use in providing communications with respect to subscriber stations of said plurality of subscriber stations using information received from subscriber stations of said plurality of subscriber stations regarding preferred randomesque beams of said plurality of randomesque beams, and cooperatively periodically change beamforming vectors for said randomesque beams.

22. The system of claim 21, wherein said base stations are further adapted to obtain information regarding preferred randomesque beams from said plurality of subscriber stations, said information regarding said preferred randomesque beams being used by said subscriber stations to determine said randomesque beam assignments.

23. The system of claim 21, further comprising:
a plurality of subscriber stations adapted to analyze signal reception on said plurality of randomesque beams, identify preferred randomesque beams of said plurality of randomesque beams to one or more base stations of said plurality of base stations, and conduct data communication with at least one base station of said plurality of base stations using a preferred randomesque beam of said plurality of randomesque beams.

24. The system of claim 23, wherein said subscriber station is further adapted to update said at least one preferred channel-independent beam without control by said base station.

* * * * *